United States Patent [19]
Horii

[11] Patent Number: 5,943,097
[45] Date of Patent: *Aug. 24, 1999

[54] IMAGE PROCESSING MEANS FOR PROCESSING IMAGE SIGNALS OF DIFFERENT SIGNAL FORMATS

[75] Inventor: Hiroyuki Horii, Hiratsuka, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/755,359

[22] Filed: Nov. 25, 1996

Related U.S. Application Data

[63] Continuation of application No. 08/361,231, Dec. 21, 1994, abandoned.

[30] Foreign Application Priority Data

Dec. 24, 1993 [JP] Japan .................................... 5-327252
Dec. 28, 1993 [JP] Japan .................................... 5-337058

[51] Int. Cl.⁶ .................................................... H04N 5/46
[52] U.S. Cl. ........................... 348/441; 348/555; 348/556
[58] Field of Search .................................... 348/556–558, 348/555, 554, 568, 565, 588, 581, 589, 598, 704, 445, 10, 12, 13, 553, 400, 443, 446, 454, 455, 458, 547, 560, 561; 455/4.2, 4.1; H04N 5/46, 5/43, 7/01

[56] References Cited

U.S. PATENT DOCUMENTS

| | | | |
|---|---|---|---|
| 5,018,014 | 5/1991 | Hashimoto | 348/560 X |
| 5,132,793 | 7/1992 | Hirahata et al. | 348/556 |
| 5,168,362 | 12/1992 | Yoshida | 348/445 |
| 5,218,436 | 6/1993 | Sugiyama et al. | 348/445 |
| 5,231,490 | 7/1993 | Park | 348/704 |
| 5,276,515 | 1/1994 | Katsumata et al. | 348/704 |
| 5,343,238 | 8/1994 | Takata et al. | 348/556 |
| 5,347,318 | 9/1994 | Kobayashi et al. | 348/588 |
| 5,351,087 | 9/1994 | Christopher et al. | 348/581 |
| 5,353,065 | 10/1994 | Katsumata et al. | 348/556 |
| 5,365,276 | 11/1994 | Imai et al. | 348/556 |
| 5,420,641 | 5/1995 | Tsuchida | 348/556 |
| 5,448,307 | 9/1995 | Gelissen | 348/584 |
| 5,455,632 | 10/1995 | Ichihara | 348/565 |
| 5,475,442 | 12/1995 | Matsushita et al. | 348/554 |
| 5,486,871 | 1/1996 | Filliman et al. | 348/558 |
| 5,493,418 | 2/1996 | Takahashi et al. | 348/581 |

FOREIGN PATENT DOCUMENTS 60-165883  5/1989  Japan .............................. H04N 7/01

*Primary Examiner*—Nathan Flynn
*Attorney, Agent, or Firm*—Fitzpatrick, Cella, Harper & Scinto

[57] ABSTRACT

An image processing apparatus capable of producing a multi-image from images based on different video signal standards. A first switch selects a video signal which has been subjected to input processing by an input processing circuit, and a second switch selects a synchronizing signal separated from the input processing circuit. The output of the first switch is applied to an image memory via a low-pass filter and an analog-to-digital converter. A reduction control circuit outputs to a memory control circuit a horizontal/vertical enable signal at a timing based on a reduction ratio k ($0<k\leq1$) received from a CPU in accordance with the synchronizing signal received from the second switch. The memory control circuit controls the write to the image memory according to the synchronizing signal received from the second switch and the enable signal received from the reduction control circuit and it also controls a write address in accordance with storing coordinate information received from the CPU.

12 Claims, 4 Drawing Sheets

IMAGE PROCESSING MEANS FOR PROCESSING IMAGE SIGNALS OF DIFFERENT SIGNAL FORMATS

This application is a continuation of application Ser. No. 08/361,231, filed Dec. 21, 1994, now abandoned.

BACKGROUND OF THE INVENTION

1. Field of the Invention

The present invention relates to an image processing apparatus and, more particularly, to an image processing apparatus which is capable of processing image signals based on different signal standards.

2. Related Background Art

Conventional image processing apparatuses for synthesizing a plurality of images into a multi-image display on a single screen include an apparatus designed to display a multi-image of channels of television broadcast on a single screen, and an apparatus designed to display a multi-image of a plurality of still pictures or a plurality of animated pictures which are recorded in recording media. All these apparatuses require that a plurality of input image signals for multi-images be all based on the same signal standard. For instance, to display a multi-image using NTSC video signals, all input image signals must be of the NTSC format.

On the other hand, however, the current television system alone involves PAL video signals, SECAM video signals, and high definition television signals in addition to the NTSC video signals. Further, various formats of digital high definition signals have been proposed for future use. In addition, input images and computer images entered through image input apparatuses such as image scanners have diverse formats.

SUMMARY OF THE INVENTION

Accordingly, it is an object of the present invention to provide an image processing apparatus which is capable of processing signals in many different signal formats as stated above.

It is another object of the present invention to provide an image processing apparatus which is capable of forming a multi-image from signals of different formats.

It is an object of one aspect of the present invention to enable easy formation of a multi-image even from images of different video signal standards by reducing input images in accordance with specified reduction ratios regardless of the signal format or the like of input images and by storing the reduced input images in appointed positions of an image memory.

It is yet another object of the present invention to provide an image processing apparatus which has novel functions.

Other objects of the present invention will become apparent from the following detailed description given in connection with the accompanying drawings.

DETAILED DESCRIPTION OF THE PREFERRED EMBODIMENTS

First Embodiment

The following describes a first embodiment according to the present invention with reference to the accompanying drawings.

Figure 1:
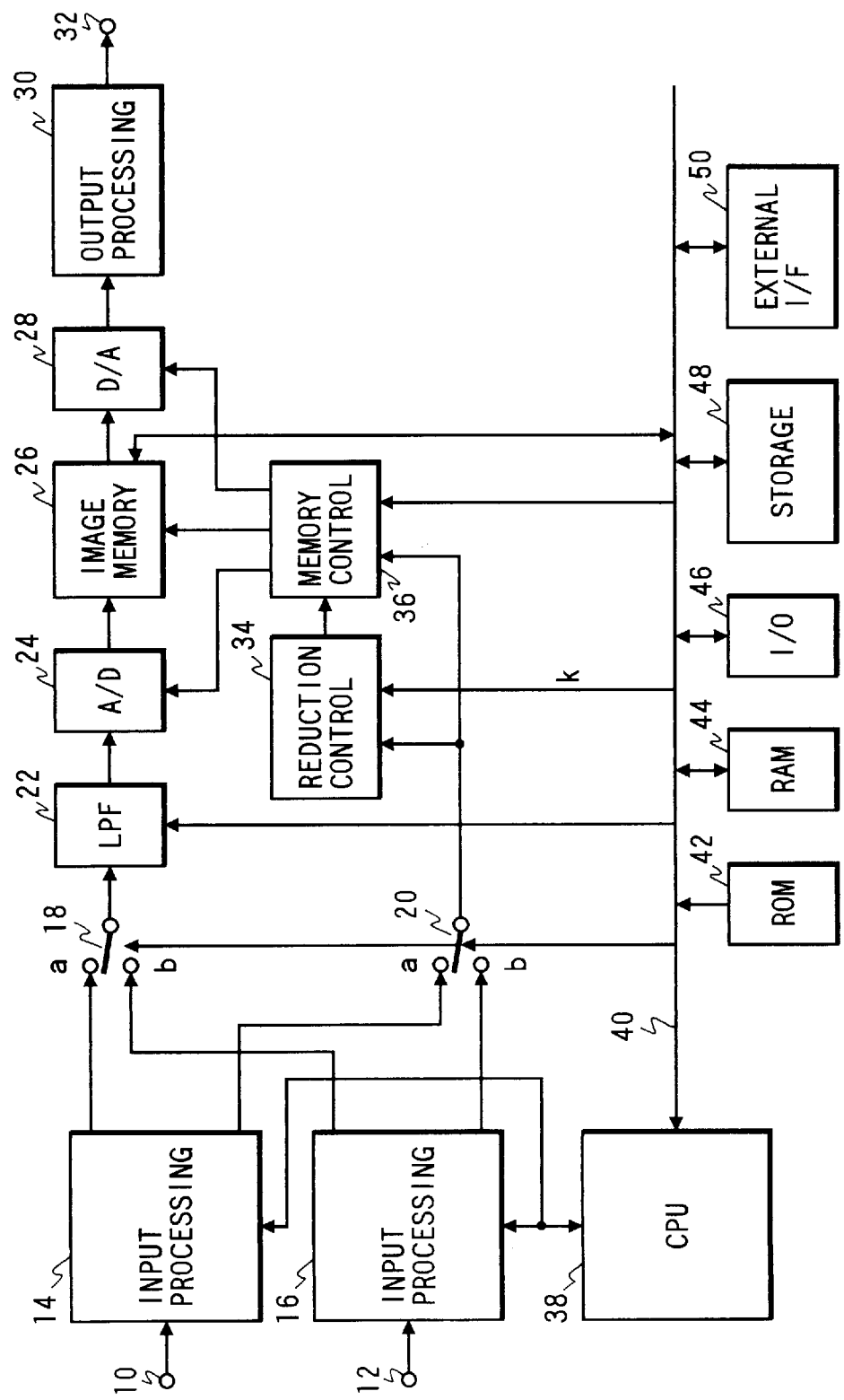
FIG. 1 is a block diagram illustrative of the schematic configuration of a first embodiment of the present invention.

FIG. 1 is the block diagram showing the schematic configuration of the first embodiment of the present invention. Reference numerals 10 and 12 denote input terminals for video signals; reference numerals 14 and 16 denote input processing circuits which convert video signals received from the input terminals 10 and 12 into ones of an RGB (or luminance and color difference) common representation format; reference numeral 18 denotes a switch for selecting the video outputs of the input processing circuits 14 and 16; and reference numeral 20 denotes a switch for selecting synchronizing signals issued from the input processing circuits 14 and 16. The switches 18 and 20 are interlocked; when the switch 18 selects the video output of the input processing circuit 14, the switch 20 selects the synchronizing signal output of the input processing circuit 14. Conversely, when the switch 18 selects the video output of the input processing circuit 16, the switch 20 selects the synchronizing signal output of the input processing circuit 16. The aforesaid input processing circuits combine NTSC, PAL, SECAM, and HD decoders; they detect the frequencies of synchronizing signals of input video signals, the number of horizontal synchronizing signals in a 1 V cycle, and the modulating frequencies for the video signals to determine the types of the video signals by a CPU 38, and decode the respective types of video signals through the appropriate decoders.

Reference numeral 22 indicates a low-pass filter (hereinafter referred to as LPF) which restricts the output band of a video output given by the switch 18; reference numeral 24 denotes an analog-to-digital converter which converts outputs of the LPF 22 into digital signals; and reference numeral 26 denotes an image memory for storing image data output from the analog-to-digital converter 24. Further, reference numeral 28 indicates a digital-to-analog converter which converts image data read from the image memory 26 into analog signals; reference numeral 30 indicates an output processing circuit which converts image signals into video signals of predetermined formats and output them; and reference numeral 32 indicates an output terminal which issues output signal of the output processing circuit 30 to the outside.

Reference numeral 34 denotes a reduction control circuit which controls the reduction of input images; and reference numeral 36 denotes a memory control circuit which controls the write and read in the image memory 26 and also supplies appropriate sampling clocks to the analog-to-digital converter 24 and the digital-to-analog converter 28.

Reference numeral 38 indicates a CPU which controls the whole system. Connected to a CPU bus 40 are a ROM 42, a RAM 44, an input/output circuit 46, a storage 48 such as a hard disk drive, and an external interface 50. The CPU 38 is capable of accessing the image memory 26 via the CPU bus 40 and it controls the switches 18 and 20, the passband of the LPF 22, the reduction control circuit 34, and the memory control circuit 36.

The operation of the embodiment will now be described in detail. The input processing circuits 14 and 16 convert the video signals received from the input terminals 10 and 12 into ones of a common signal format such as the RGB signal format (or luminance signal and color difference signal format) and supply them to contact a and contact b of the switch 18. The input processing circuits 14 and 16 also supply horizontal and vertical synchronizing signals, which have been separated from the video signals, to contact a and contact b of the switch 20.

The synchronizing signal selected by the switch 20 is applied to the reduction control circuit 34 and the memory control circuit 36. A control signal of a reduction ratio k ($0<k\leq 1$) is supplied from the CPU 38 to the reduction control circuit 34. The reduction control circuit 34 issues horizontal/vertical enable signals to the memory control circuit 36 at timings based on the reduction ratio k in accordance with the synchronizing signals received from the switch 20. The CPU 38 supplies information on a memory coordinate on the image memory 26 to the memory control circuit 36, then the memory control circuit 36 generates sampling clocks for the analog-to-digital converter 24 and the write address and write control signals for the image memory 26 in accordance with the synchronizing signals received from the switch 20 and the enable signals from the reduction control circuit 34.

The video signal selected by the switch 18 is applied to the LPF 22, then the LPF 22 restricts the signal from the switch 18 to the band controlled by the CPU 38. The analog-to-digital converter 24 converts the output of the LPF 22 to a digital signal in accordance with the sampling clock received from the memory control circuit 36 and applies it to the image memory 26. The image memory 26 stores, in sequence, the output data of the analog-to-digital converter 24 in write addresses specified by the memory control circuit 36. Thus, reduced images are stored in the image memory 26 in the coordinate positions specified by the CPU 38 at the reduction ratio k designated by the CPU 38.

The processing described above is carried out on a predetermined number of input images received through the input terminals 10 and 12 to store a multi-image constituted by a predetermined number of images, e.g., 3×3 or 5×5, in the image memory 26.

When a multi-image consisting of a desired number of images has been produced in the image memory 26, the CPU 38 instructs the memory control circuit 36 to read data. In response to the instruction, the memory control circuit 36 sequentially reads stored data from the image memory 26. The image data read from the image memory 26 are converted into analog signals by the digital-to-analog converter 28 and further converted by the output processing circuit 30 to video signals of a predetermined format which is compatible with output equipment such as a monitor (not shown). The output of the output processing circuit 30 is issued through the output terminal 32 and applied to an external monitor (not shown) for video display.

The image memory 26 is communicates with the storage 48 and the external interface 50 via the CPU bus 40. The data stored in the image memory 26 can be stored in the storage 48 or output to external equipment (not shown) such as an external monitor, via the external interface. Conversely, the images stored in the storage 48 can be stored in the image memory 26 in their original scales or reduced scales; further, the images taken in from the external equipment via the external interface 50 can be stored in the image memory 26 in their original scales or reduced scales. The reduction can be accomplished by the CPU 38 which carries out the aforesaid analog-to-digital conversion and memory control by running software.

Figure 2:
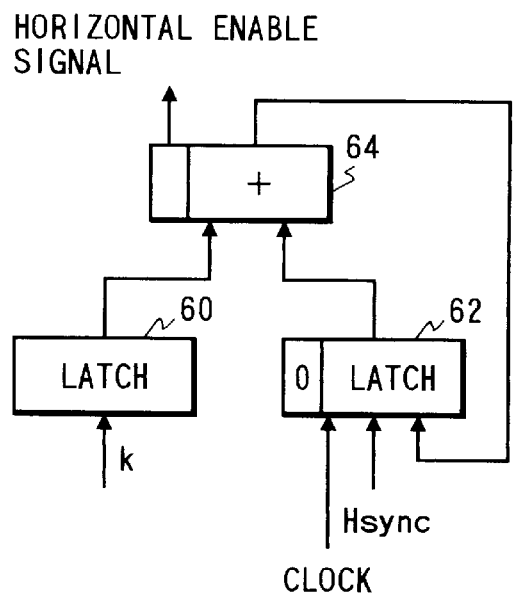
FIG. 2 is a circuit diagram of a horizontal enable signal generating circuit of a reduction control circuit.

FIG. 2 shows an example of the reduction control circuit 34, which is illustrative of a circuit section responsible for horizontal reduction. The reduction control circuit 34 includes a latch 60 which stores the reduction ratio k received from the CPU 38, a latch 62 which temporarily stores a coefficient value, and an adder 64 which adds the values held by the latches 60 and 62. The most significant bit (MSB) of the adder 64 provides the horizontal enable signal, the remaining bits becoming inputs to the latch 62. The most significant bit of the latch 62 is always 0.

The latch 60 stores the reduction ratio k received from the CPU 38; the latch 62 is reset by a horizontal synchronizing signal Hsync. The adder 64 adds the values held by the latches 60 and 62, the MSB of the result of the addition becoming the horizontal enable signal. The bits other than the MSB of the result of the addition are supplied to the latch 62 and taken in according to clocks. The horizontal enable signal advances the horizontal address counter of the memory control circuit 36. This causes, for example, the horizontal enable signal to be generated once every two clocks when the horizontal reduction ratio is 0.5, or once every four clocks when the horizontal reduction ratio is 0.25.

Figure 3:
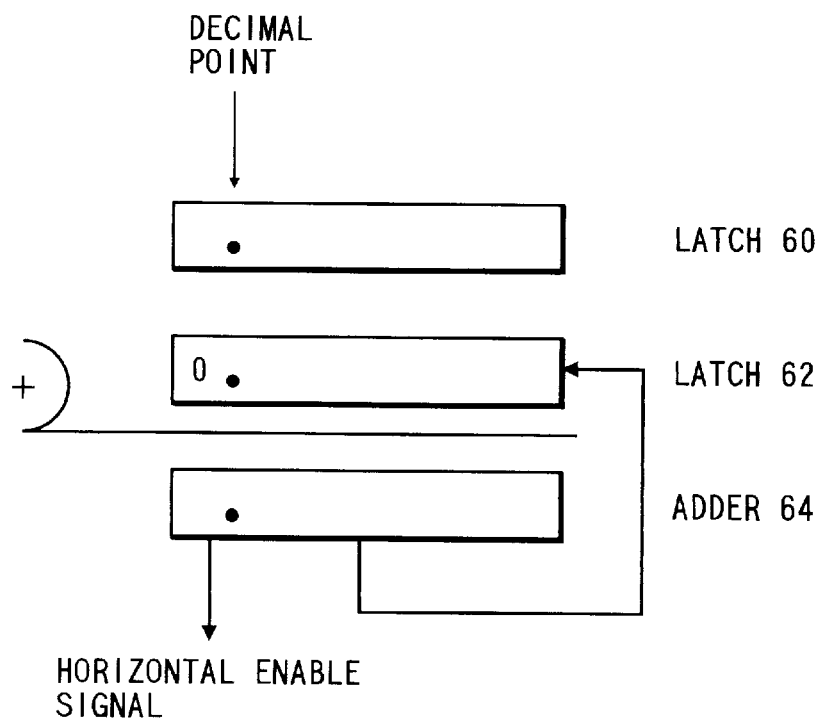
FIG. 3 shows an arithmetic representation which corresponds to FIG. 2.

FIG. 3 arithmetically illustrates the operation shown in FIG. 2. The top stage shows the stored value (reduction ratio k) of the latch 60 and the stage below it shows the value stored in the latch 62. The decimal place section of the addition result is fed back to the latch 62. The MSB of the latch 62 is always 0. If the addition result causes a carry, then the carry is output as the horizontal enable signal to the memory control circuit 36.

Whenever 1 is set in the latch 60, the MSB of the addition result becomes always 1, the horizontal enable signal being always generated for each clock. In other words, an image is written to the image memory 26 on a non-reduced scale, i.e., on the equal scale.

The description given above refers to the horizontal reduction; the same applies to vertical reduction. If, for instance, a reduction ratio of 25% is instructed for horizontal and vertical reduction for an NTSC video signal of 640×480 picture elements, then a reduced image of 160×120 picture elements is obtained. Likewise, when a reduction ratio of 20% is instructed for horizontal and vertical reduction for a PAL video signal of 768×576 picture elements, then a reduced image of 154×115 picture elements can be obtained. If a reduction ratio of 10% is instructed for horizontal and vertical reduction for a high definition television video signal of 1,920×1,035 picture elements, then a reduced image of 192×104 picture elements can be obtained.

Figure 4:
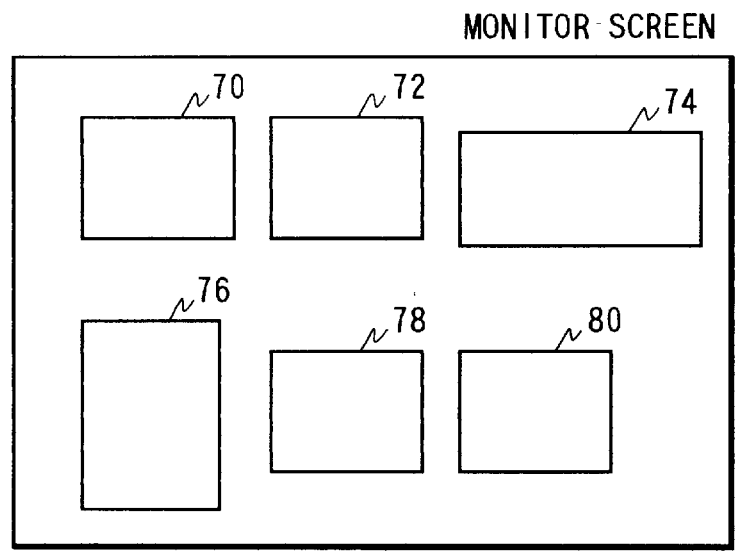
FIG. 4 shows an example of a multi-image according to the first embodiment.

FIG. 4 shows an example of a multi-image displayed on a monitor screen. In the figure, reference numeral 70 denotes a reduced image which has been produced by reducing an NTSC video image at a reduction ratio of 25% horizontally and vertically; reference numeral 72 denotes an image produced by reducing a PAL video image at a reduction ratio of 20% horizontally and vertically; and reference numeral 76 is a result obtained by reducing an image which has been entered through an image scanner or the like and taken in through the external interface 50. Reference numeral 78 denotes a reduced image of the NTSC video image; and reference numeral 80 denotes a reduced image of the PAL video image.

According to this embodiment, it is possible to display different types of video signals in the form of images of nearly the same size regardless of the signal format of video signals by changing the reduction ratio according to each type of video signal as described above.

It is needless to mention that the processing for producing a multi-image discussed above is also applicable to the images stored in the storage 48 or the images entered through the external interface 50 in addition to the images entered through the input terminals 10 and 12. Furthermore, the external interface 50 may of course be a communication interface.

As it can be easily understood from the description given above, according to this embodiment, images of different signal formats can be handled very easily and a multi-image can be produced freely, making it possible to display a multi-image display without suffering from the problem caused by different signal formats of input images.

Second Embodiment

Figure 5:
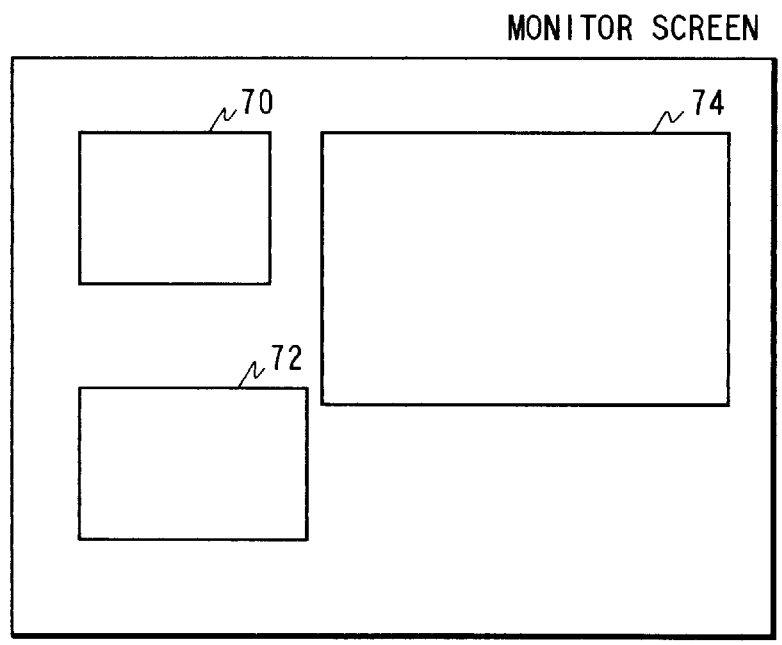
FIG. 5 shows an example of a multi-image according to the second embodiment.
Figure 6:
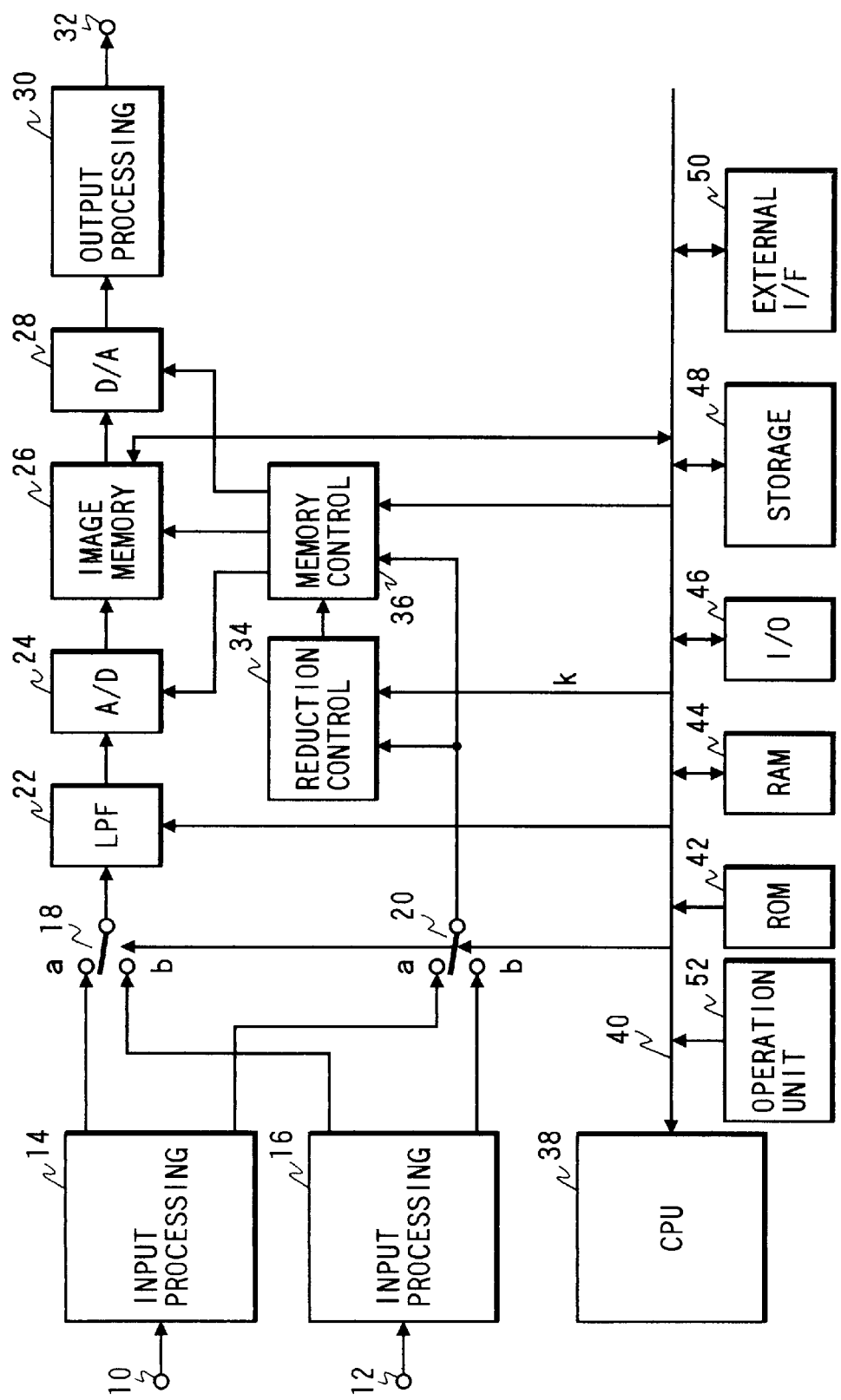
FIG. 6 is a block diagram illustrative of the schematic configuration of the second embodiment.

The first embodiment is designed to change the reduction ratio k in accordance with the type of video signal, thereby displaying reduced images of a nearly identical size in a multi-image. In the second embodiment, the input images are uniformly set as shown in FIG. 5. The configuration of this embodiment is shown in FIG. 6. The second embodiment differs from the first embodiment in that the reduction ratio k can be set by an operation unit 52. When an NTSC video signal of 640×480 picture elements is entered and if, for example, the reduction ratio is set to 20%, then a reduced image of 128×96 picture elements is produced by the reduction. When a PAL video signal of 768×576 picture elements is entered, a reduced image of 154×115 picture elements is produced by the reduction. Further, when a high definition television video signal of 1,920×1,035 picture elements is entered, a reduced image of 384×207 picture elements is obtained by the reduction. These reduced images are displayed as an image 70 produced by reducing the NTSC image by 20% horizontally and vertically, an image 72 produced by reducing the PAL image by 20% horizontally and vertically, and an image 74 produced by reducing the high definition television image by 20% horizontally and vertically as shown in FIG. 5. This enables the display of a multi-image in which the different sizes of input images represent different resolutions.

The present invention is not limited to the embodiments described above. It is apparent that other embodiments and modifications of the present invention are possible within the scope indicated by the claims.

What is claimed is:

1. An image processing apparatus usable with an interface and a storing means, comprising:

input means for entering a plurality of different types of image signals of different broadcast standards, said plurality of different types of image signals including an inputted image signal input via the interface, and a stored image signal which has been input via the interface and stored in the storing means;

determining means for determining the broadcast standards of the inputted image signals;

processing means for converting the plurality of different types of image signals into a corresponding plurality of image signals of the same format;

reducing means for determining a reduction ratio of images composed of image signals entered through said input means in accordance with a determination result of said determining means, and for reducing said corresponding plurality of image signals of the same format converted by the processing means in the determined reduction ratio; and output means for outputting a plurality of types of images which are reduced by said reducing means, Wherein said output means outputs said plurality of types of images in substantially the same size as well as visually displays them at the same time.

2. An image processing apparatus according to claim 1, wherein said broadcast standards comprise NTSC, PAL, SECAM, and a standard having a resolution greater than NTSC.

3. An image processing apparatus according to claim 1, wherein said input means converts a plurality of types of different signal formats of said different broadcast standards into image signals of a common format.

4. An image processing apparatus according to claim 1, wherein said reducing means reduces said images by controlling a sampling cycle of the image signals inputted by said input means.

5. An image processing apparatus according to claim 1, further comprising storing means for storing an image reduced by said reducing means.

6. An image processing apparatus according to claim 5, further comprising storing position control means for controlling a storing position in said storing means.

7. A method of processing image signals comprising the steps of:

receiving a plurality of different types of image signals having different broadcast standards, said plurality of different types of image signals including an inputted image signal input via an interface, and a stored image signal which has been input via said interface and stored in a storing means;

determining the broadcast standards of the inputted image signals;

processing means for converting the plurality of different types of image signals into a corresponding plurality of image signals of the same format;

determining a reduction ratio of images composed of inputted image signals in accordance with a determination result of the determination step, and reducing the corresponding plurality of image signals of the same formal converted by the processing means in the determined reduction ratio; and outputting on the same screen a plurality of types of images which are reduced in the reducing step, wherein in said outputting step, said plurality of types of images are output at the same time.

8. A method according to claim 7, wherein the input step inputs signals of at least two of NTSC, PAL, SECAM, and a standard having a resolution greater than NTSC.

9. A method according to claim 7, wherein the input step converts a plurality of types of different signal formats of the different broadcast standards into image signals of a common format.

10. A method according to claim 7, wherein said reducing step reduces the images by controlling a sampling cycle of the inputted image signals.

11. A method according to claim 7, further comprising the step of storing an image reduced in the reducing step.

12. A method according to claim 11, further comprising the step of controlling a storing position of the stored reduced image.

* * * * *

UNITED STATES PATENT AND TRADEMARK OFFICE
CERTIFICATE OF CORRECTION

PATENT NO. : 5,943,097
DATED : August 24, 1999
INVENTOR(S) : Hiroyuki Horii

It is certified that error appears in the above-identified patent and that said Letters Patent is hereby corrected as shown below:

COLUMN 2:

Line 51, "output" should read --outputs--.

COLUMN 3:

Line 58, delete "is".

COLUMN 5:

Line 11, delete "it".

UNITED STATES PATENT AND TRADEMARK OFFICE
CERTIFICATE OF CORRECTION

PATENT NO. : 5,943,097

DATED : August 24, 1999

INVENTOR(S) : Hiroyuki HORII

It is certified that error appears in the above-identified patent and that said Letters Patent is hereby corrected as shown below:

COLUMN 6:

Line 5, "Wherein" should read --wherein--; and

Line 45, "formal" should read --format--.

Signed and Sealed this

Second Day of May, 2000

Q. TODD DICKINSON

*Attest:*

*Attesting Officer*  *Director of Patents and Trademarks*